(12) United States Patent
Hekstra et al.

(10) Patent No.: US 9,775,034 B2
(45) Date of Patent: Sep. 26, 2017

(54) COMMUNICATIONS WITH DISTANCE AUTHENTICATION

(71) Applicant: NXP B.V., Eindhoven (NL)

(72) Inventors: Andries Hekstra, Eindhoven (NL); Arie Koppelaar, Giessen (NL); Stefan Drude, Waalre (NL); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 392 days.

(21) Appl. No.: 14/615,738

(22) Filed: Feb. 6, 2015

(65) Prior Publication Data

US 2016/0234684 A1 Aug. 11, 2016

(51) Int. Cl.
| | | |
|---|---|---|
| G06F 21/00 | (2013.01) | |
| H04W 12/06 | (2009.01) | |
| G06F 21/35 | (2013.01) | |
| G06F 21/30 | (2013.01) | |
| H04K 1/02 | (2006.01) | |
| H04K 3/00 | (2006.01) | |
| H04L 29/08 | (2006.01) | |

(52) U.S. Cl.
CPC ............ *H04W 12/06* (2013.01); *G06F 21/30* (2013.01); *G06F 21/35* (2013.01); *H04K 1/02* (2013.01); *H04K 3/86* (2013.01); *H04L 67/1095* (2013.01)

(58) Field of Classification Search
CPC .......... G06F 21/30; G06F 21/34; G06F 21/35; G06F 21/42; G06F 21/43; G06F 21/44
See application file for complete search history.

(56) References Cited

U.S. PATENT DOCUMENTS

| | | | |
|---|---|---|---|
| 7,444,118 B2 | 10/2008 | Boh et al. | |
| 8,620,394 B2 | 12/2013 | Sebastiano et al. | |
| 2005/0058292 A1* | 3/2005 | Diorio .................. | G06K 7/0008 380/270 |
| 2010/0281261 A1 | 11/2010 | Razzell et al. | |
| 2011/0258449 A1 | 10/2011 | Rosner et al. | |
| 2012/0105219 A1 | 5/2012 | Kofler | |
| 2013/0214732 A1 | 8/2013 | Nowottnick | |

(Continued)

FOREIGN PATENT DOCUMENTS

DE 102005051493 A1 7/2007

OTHER PUBLICATIONS

Flury et al., "Effectiveness of Distance-Decreasing Attacks Against Impulse Radio Ranging", WiSec 2010.

(Continued)

*Primary Examiner* — Edward Zee
(74) *Attorney, Agent, or Firm* — Rajeev Madnawat

(57) ABSTRACT

Distance-based authentication is provided for mitigating undesirable interaction and/or attacks upon ranging systems, such as those involving vehicle entry or secure payment. As may be implemented in accordance with one or more embodiments, a leading edge of one or more pulses in a waveform of a signal is obscured as part of distance-based authentication. For instance, noise may be generated via a noise modulation circuit and combined with some or all of a leading edge of a pulse. Distance-based authentication is provided by transmitting a signal with a waveform having the obscured portion of the leading edge, which operates to mitigate detection of the polarity of the leading edge or otherwise of the leading edge itself.

20 Claims, 12 Drawing Sheets

(56) References Cited

U.S. PATENT DOCUMENTS

2014/0232528 A1    8/2014 Han et al.

OTHER PUBLICATIONS

Poturalski et al., "Distance Bounding with IEEE 802.15.4a: Attacks and Countermeasures", IEEE Transactions on Wireless Communications, vol. 10, No. 4, Apr. 2011.

Poturalski et al., "On Secure and Precise IR-UWB Ranging", IEEE Transactions on Wireless Communications, vol. 11, No. 3, Mar. 2012.

AMS, AS3932 Datasheet—Applications "3D Low Frequency Wakeup Receiver", Revision 1.7, pp. 1-34, www.ams.com/LF-Receiver/AS3932.

M. van Elzakker et al., "A 10-bit Charge-Redistribution ADC Consuming 1.9uW at 1 MS/s," IEEE JSSC, May 2010.

I.-Y. Lee et al., "A Fully Integrated TV Tuner Front-End with 3.1 dB NF, >+31dBm OIP3, >83dB HRR3/5 and >68dB HRR7," IEEE ISSCC, 2014.

Harpe et al., "A 0.47-1.6 mW 5-bit 0.5-1 GS/s Time Interleaved SAR ADC for Low-Power UWB Radios," IEEE JSSC, Jul. 2012.

J. van Sinderen et al., "Wideband UHF ISM-Band Transceiver Supporting Multichannel Reception and DSSS Modulation," IEEE ISSCC, 2013.

Extended European Search Report for Patent Appln. No. 16153799.8 (dated Jun. 29, 2016).

* cited by examiner

COMMUNICATIONS WITH DISTANCE AUTHENTICATION

Aspects of various embodiments are directed to communications, and to authentication that is based upon a distance between components involved in the communications.

Many communication approaches require synchronization and authentication, which have been implemented using a multitude of approaches. For instance, radio frequency (RF) ranging systems often employ a time-of-flight principle to determine a distance between two objects, or markers on objects, that are communicating between one another. Proximity can be used from a security and authentication perspective, such as by ensuring that a remote device to be connected to a local device is within a predetermined threshold distance of the local device (e.g., to prevent unwanted connections to other devices in relative proximity). Security information can also be communicated, in connection with the time-of-flight communication.

In many applications, a waveform (e.g., a chirp or a pulse) can be transmitted and reflected or retransmitted by an object or marker on an object. Based on the amount of time it takes for the reflection or retransmission to return to the original transmitter, the distance between the objects, or markers on the objects, can be ascertained.

While various approaches have been implemented for communications in these regards, such communications are susceptible to unwanted interception and/or manipulation. These issues can be particularly relevant to certain types of communications, such as in vehicle access and secure payment systems.

These and other matters have presented challenges to communications and related aspects such as distance-based verification, for a variety of applications.

Various example embodiments are directed to distance-based authentication methods, apparatuses (and related circuits) and their implementation.

According to an example embodiment, distance-based authentication is carried out as follows. A first signal is generated as part of the distance-based authentication, with a waveform having a plurality of pulses with each pulse in the waveform having a leading edge, a peak portion, and a trailing edge. For at least one pulse of the plurality of pulses, a portion of the leading edge is obscured by generating noise via a noise modulation circuit and combining the noise with at least the leading edge of the at least one pulse. Distance-based authentication is provided by transmitting a second signal with a waveform having the obscured portion of the leading edge between first and second communication circuits, such as radio frequency (RF) devices that include RF communication and logic circuitry, or optical communication devices that include optical circuitry for transmitting, receiving and processing data in optical signals.

Another example embodiment is directed to an apparatus comprising a first circuit that generates, as part of distance-based authentication, a first signal with a waveform having a plurality of pulses in which each pulse in the waveform has a leading edge, a peak portion and a trailing edge. A second circuit obscures at least a portion of the waveform by combining the noise with the portion of the waveform, thereby providing a second signal with a waveform having the obscured portion thereof. A third circuit provides the distance-based authentication by transmitting a second signal with a waveform having the obscured portion between first and second communication circuits. In some implementations, the second circuit obscures the portion of the waveform by combining the noise with at least the leading edge of at least one of the pulses, thereby obscuring the onset of the pulse. In other implementations, the second circuit obscures the portion of the waveform by combining the noise with a portion of the waveform between the pulses, thereby obscuring a lack of a pulse in the portion of the waveform. This latter approach may, for example, be effective for obscuring a value (e.g., zero) associated with the lack of a pulse, such as may be implemented with an on-off keying (OOK) approach. In these contexts, a variety of types of signals can be obscured, such as for RF signals and optical signals.

Another more particular embodiment is directed to mitigating third-party interference with communications between a first RF device and a second RF device with distance-based authentication. As part of the distance-based authentication, a first signal is generated with a waveform having a plurality of pulses, and each pulse in the waveform having a leading edge, a peak portion and a trailing edge. Noise is generated and combined with at least the leading edge of at least one pulse of the plurality of pulses, therein obscuring a portion of the leading edge. A second signal with a waveform having the at least one pulse with an obscured leading edge is thus provided, and transmitted between the first and second RF devices for the distance-based authentication.

Another embodiment is directed to an apparatus having respective circuits that provide for distance-based authentication as follows. A first circuit generates, as part of the distance-based authentication, a first signal with a waveform having a plurality of pulses with each pulse in the waveform having a leading edge, a peak portion, and a trailing edge. A second circuit obscures, for at least one pulse of the plurality of pulses, a portion of the leading edge by generating and combining noise with at least the leading edge of the at least one pulse. A third circuit provides the distance-based authentication by transmitting a second signal with a waveform having the obscured portion of the leading edge between first and second RF devices.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
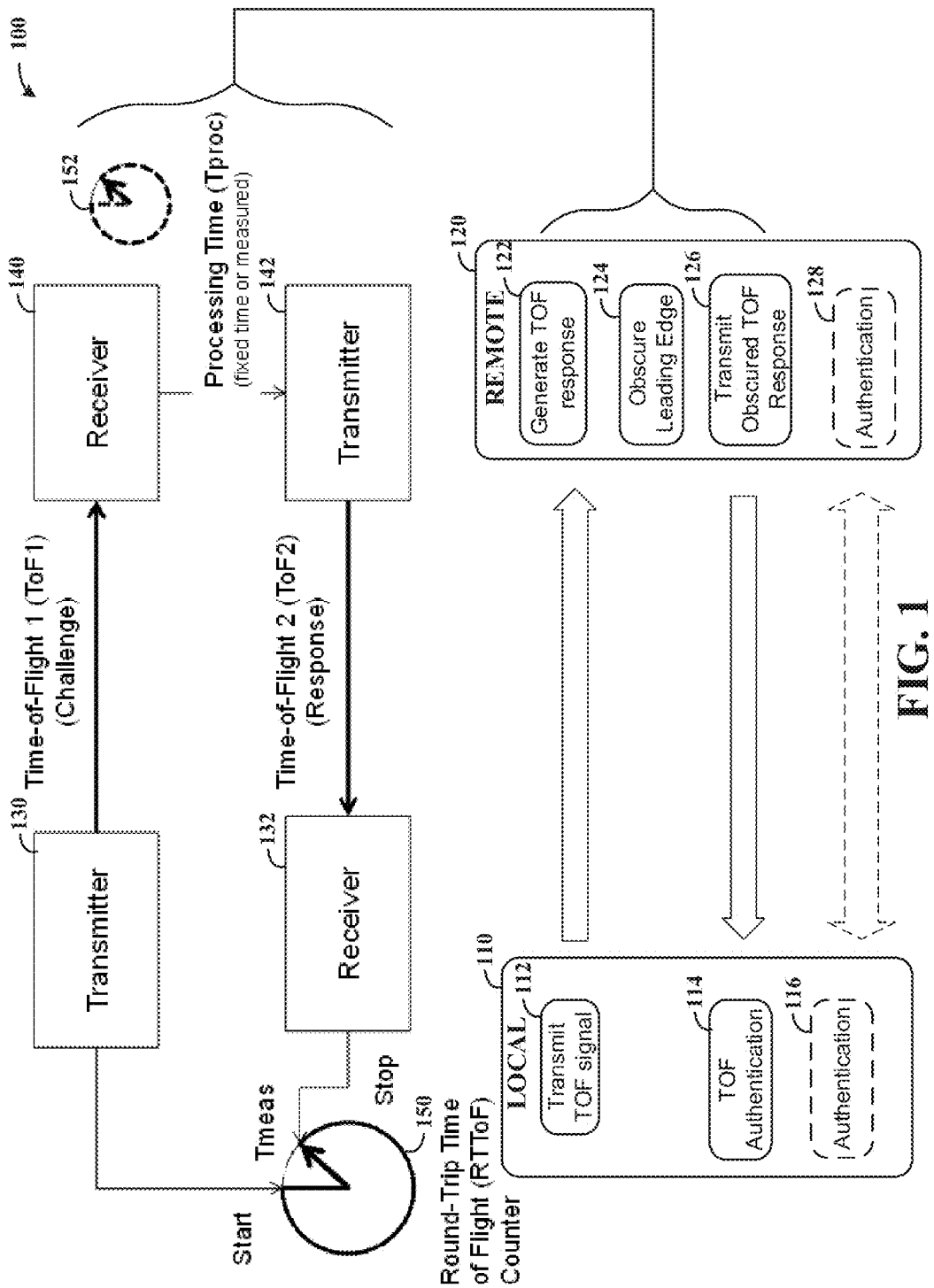
FIG. 1 shows a communication apparatus and approach involving distance-based authentication, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving the communication of signals for distance determination, and related aspects for providing security based upon the distance. In certain implementations, aspects of the present disclosure have been shown to be beneficial when used in the context of vehicle entry or with secure payment, such as for preventing unauthorized interference with signals. Various signals may be communicated in this regard, and over various communication mediums. For instance, optical signals or RF signals can be obscured using similar approaches, and can mitigate undesirable access to, use of, or interference with the signals. While not necessarily so limited, various aspects may be appreciated through a discussion of examples using such exemplary contexts. For instance, various embodiments as discussed below and shown in the figures using RF signals by way of example, may be implemented using optical signals and various communication mediums.

According to various example embodiments, aspects of the present disclosure are directed to apparatuses and methods involving the introduction of variation in a transmitted secure ranging signal that is unpredictable to an attacker. Random-based noise is added to individual pulses of a transmitted signal (e.g., in a bandlimited pulse based secure ranging system). This random-based noise may, for example, include a random or pseudo random signal. The random-based noise in the transmitted signal conceals the presence of a portion of a waveform, such as leading edge of a pulse or portions in-between pulses, relative to an attacker attempting to observe the transmitted signal (e.g., using high signal-to-noise ratio compared to the legitimate receiver). Further, such noise may be added to a limited portion of a waveform or radio packets, such as ranging portions or preamble portions of a message, while transmitting other portions of a waveform such as those involving configuration portions of a header (e.g., defining a packet length or CRC data) without such added noise.

In accordance with various embodiments, such an approach may, for example, mitigate or prevent such an attacker from ascertaining a value associated with a waveform (pulse or no pulse), or transmitting an early copy of the body of the pulse (in parallel), which may otherwise provide a false indication of a shortened range of distance that the ranging signal travels. Certain embodiments are directed to automotive or secure payment applications that require a transmitter to be within a certain range for authentication. In such embodiments, this approach can prevent attackers from providing a false indication that such a transmitter is closer (e.g., to a vehicle or payment system) than it actually is, and therein prevent the attacker from tampering with a distance-based authentication of the transmitter. As such, various embodiments are directed to key fobs and other entry/access transmitters, or to secure payment devices such as mobile telephones or smartcards.

In various embodiments, the random-based noise is added to a leading edge of a pulse (or more) of a ranging signal before the signal is transmitted. When the noise is sufficient to obscure the leading edge relative to the noise, the signal to noise ratio (SNR) of any observation by an attacker is limited to the SNR at which the signal is put onto the transmit antenna. This way, the advantage in SNR that an attacker could achieve over a legitimate receiver (e.g., in an automobile or payment system) that is at a distance of interest to range detection, can be bounded.

Random-based noise is added to obscure aspects of a variety of types of signals, to suit particular embodiments. For instance, in passive keyless entry (PKE) or secure payment systems, such a distance of interest may be on the order of a few meters or less. Where employed with on-off keying (OOK), the random-based noise is added for both the "on" and the "off" pulse, which can be allowed to limit the addition of the noise to that time interval that corresponds to the first half of a pulse time interval. Where employed for binary phase-shift keying (BPSK), the noise is added for both positive and negative instances of the pulse amplitude. Certain embodiments involve multi-level or quadrature amplitude modulation. In certain embodiments, the random-based noise signal is generated such that it is statistically independent of the amplitude level of a given pulse position, and avoids conveying information to an attacker about this level through the level-dependent statistics of the noise. In this context, statistically independent noise may include noise having a statistical dependence that is insignificant or intractable.

In various implementations, a Time-of-Flight principle is used to determine or otherwise verify a distance between two objects or markers on objects as follows. A transceiver sends out a waveform such as a chirp or a pulse, which is either reflected by a remote device or retransmitted by another transceiver. Based on the amount of time it takes for the reflection or retransmission to reach the originating transceiver's receiver, the distance between the objects can be calculated. Accordingly, an attacker of the ranging system may be closer to a transmitter antenna than a receiver of a legitimate user is, or may use a more expensive, higher quality receiver apparatus. Such an attacker may thus observe transmitted pulse-based signals at a much higher SNR than the intended receiver. At a sufficiently high SNR, the attacker can detect the presence/absence of a pulse (e.g., with OOK modulation, or the polarity of a pulse (e.g., with BPSK), via detection of the rising edge of the transmitted pulse signal (before the main body of the pulse is transmitted). For instance, as bandwidth may be limited under certain regulations for ranging systems, a leading part of transmitted pulses may give away the information that the main body of the pulse is to arrive a short time span later. An attacker does not have to comply with official bandwidth and/or transmission power regulations, and can superimpose a higher energy pulse of which the leading edge has been cut, and that immediately starts with the main pulse body that the receiver is looking for in its detection scheme. Through this negative delay of this superimposed pulse, the receiver can effectively shorten round trip delay that the ranging system is measuring. Various embodiments are directed to obscuring this leading edge, such as by obscuring the polarity of the leading edge or obscuring the existence of the leading edge.

Embodiments herein may be applied to a variety of applications. In some embodiments, distance authentication is carried out for automotive PKE in which the ranging system is susceptible to attack via erroneously measuring or detecting a smaller distance between an automobile and key fob due to attacker activity (e.g., where the doors of the vehicle may be unlocked and the car may be stolen). Certain embodiments are directed to secure payment systems that employ a secure ranging subsystem to block transactions where a distance between a smart card and a reader (e.g., employing near field communications (NFC)) is used for authentication. In each of these embodiments, a leading edge of a distance authentication signal is obscured such that an attacker cannot interfere in this regard. Further, a distance determination as characterized herein may, for example, involve a binary decision as to whether transceivers are within an allotted distance or not (e.g., without necessarily calculating or otherwise using an actual distance).

In accordance with certain embodiments, a (first) ranging signal is generated with a waveform having pulses. A portion of the leading edge of one or more of the pulses is obscured with noise, and distance-based authentication is provided by transmitting the (second) obscured signal with a waveform having the obscured portion of the leading edge, between first and second RF devices. For instance, noise may be generated in a noise modulation circuit and combined (e.g., added or multiplied) with at least a portion of the leading edge of a pulse. In some implementations, the noise signal is modulated such that it is independent of the bit value or symbol value that is conveyed via the transmitted pulse.

In this context, the pulse includes a peak that is used for ranging, and has a majority of energy in the pulse and an amplitude that is greater than amplitude levels of the leading edge and any trailing edge. The leading edge has a duration that is a multiple of a duration of the peak portion (e.g., such that a majority of the energy of the pulse is centered on the peak over a short period of time, while the leading edge slowly ramps up in amplitude over a much longer period of time). Accordingly, by obscuring some or all of the leading edge, an attacker cannot detect the pulse until the peak has been (partially) transmitted.

Communications in this regard may be carried out in a variety of manners. For instance, in ranging systems involving a base station (e.g., in an automobile or a contactless payment device) and a remote transponder, the leading edge of a ranging pulse may be masked for pulses sent from one or both devices. Further, communications between such devices may be initiated at different ones of the devices, to suit particular applications. In some instances, a base station sends a time-of-flight challenge, and a transponder sends a time-of-flight response after receiving the challenge, with the leading edge of the time-of-flight response masked to prevent an attacker from interfering (e.g., and unlocking a door or carrying out a payment). In certain instances, a base station initiates a time-of-flight challenge signal with its leading edge masked, to inhibit detection and acceleration of the leading edge by an attacker. In some embodiments, the ranging communication also involves communicating data that is used for data-based authentication.

A variety of types of noise may be used in this regard. In some embodiments, the noise is statistically independent of an amplitude level of the leading edge of a first signal waveform as discussed above. The obscured (second) signal is used to provide an indication of distance between the first and second RF devices, based upon a time over which the second signal is transmitted, while using the statistically independent noise to mitigate detection of the leading edge by a third RF device. Further, random-based noise may include random noise, pseudorandom noise or pulses injected to mask a peak or polarity. In addition, the generated noise may include data, with certain more detailed examples discussed below. In particular implementations, noise is generated to cancel statistical bias introduced by a pulse of the signal by biasing distribution of the noise, which can mitigate probability of "guessing attacks." In some implementations, the noise is data-dependent, for example making the noise smaller in case there is a pulse for OOK or making noise mainly to have opposite polarity to the main pulse in case of BPSK. Further, the noise may be spectrally shaped to suit particular applications, such as in accordance with regulations on bandwidth or with spectral masking.

In some implementations, obscuring the leading edge includes combining noise, received from the noise modulation circuit at a first input, with the leading edge of the pulse as received at a second input that is different than the first input. In certain implementations, noise is injected at the leading edge of a position of the pulse. In these implementations, the polarity of the leading edge may be obscured, or the leading edge itself may be obscured completely (or nearly so).

While some embodiments involve communications at one of a transmitting or receiving device, some embodiments involve both transmission and reception, as noted above. In a particular embodiment, an initial signal is transmitted from a first RF device to a second RF device as noted above, with a noise-obscured signal sent in response to the initial signal. Communications are synchronized between the devices based upon signals communicated there between, such as by way of a side channel. In certain implementations, distance-based authentication is carried out by calculating a trip time that includes a time between transmission of an initial signal (e.g., time-of-flight challenge) by the first RF device and reception of a response signal (e.g., time-of-flight response) sent by the second RF device, and providing a distance between the first and second RF devices based on the trip time. Calculating the trip time may, for example, include calculating a time that includes time for processing the initial signal, for generating and obscuring the response signal, and transmitting the obscured response signal. The trip time may also include time for processing the signal received at the device sending the initial signal, or further communications (e.g., with multiple challenge/response signals sent).

Another embodiment is directed to an apparatus having respective circuits that provide for distance-based authentication as follows. A first circuit generates, as part of the distance-based authentication, a first signal with a waveform having a plurality of pulses, each pulse having a leading edge, a peak portion and a trailing edge. A second circuit obscures some or all of the leading edge of at least one pulse by generating and combining noise with the leading edge. A third circuit transmits a second signal with a waveform having the obscured portion of the leading edge between first and second RF devices. This second signal may thus be generated as an obscured version of the first signal generated at a common RF device, such as for a time-of-flight challenge or response. In some implementations, the second circuit generates noise that is statistically independent of an amplitude level of the leading edge of the first signal waveform, and uses the statistically independent noise to mitigate detection of the leading edge by an external device during a distance-based determination. Each of the first, second and third circuits may be included in an RF device, such as a transponder or base station. In some implementations, the first circuit synchronizes operation of the first RF device and based on a signal or signals communicated with the second RF device. The distance-based authentication is based on trip time that includes a time for transmission of the signals.

In some embodiments, the apparatus includes a signal modulation circuit that generates noise that is statistically independent of an amplitude level of the leading edge of the first signal. The apparatus also includes a combining circuit connected to the signal modulation circuit and to the first circuit, and operates to receive the generated statistically independent noise from the signal modulation circuit at a first input and receive the first signal at a second input, and combines the signals received at each input.

Turning now to the Figures, FIG. 1 shows a communication apparatus 100 and an approach involving distance-based authentication, which may involve time-of-flight (TOF) calculation, and which may be implemented in accordance with various embodiments. At a local device 110, a TOF signal is transmitted at block 112. The TOF signal is received and processed at remote device 120 for providing a response. In these contexts, the local and remote device 110 and 120 may be implemented with radio-frequency circuitry and accompanying logic circuitry. Specifically, remote device 120 generates a TOF response signal 122, obscures a leading edge of the response signal at block 124, and transmits the obscured TOF response at block 126. Obscuring in this regard may, for example, involve generating random-based noise (e.g., random or pseudorandom noise) and combining the noise with the TOF response signal 122. Synchronization may also be carried out using these and/or other communications.

In various embodiments, further distance-based (or other) authentication is carried out at blocks 116 and 128, such as for transmitting additional signals that serve to provide authentication of one or both of the respective local and remote devices. For instance, this authentication may involve transmitting encryption or other data that can be used to verify the respective devices. In certain embodiments, such authentication communications are carried out within the TOF signal and TOF response, such as by including authentication information via pulses that are also used to carry out a distance-based calculation.

In a particular time-of-flight implementation, transmitter 130, which may be implemented at local device 110, sends a time-of-flight challenge signal to receiver 140, which may be implemented at remote device 120. Transmitter 142 implemented at remote device 120 responds with a time-of-flight response signal having an obscured leading edge and which is received by receiver 132 implemented at local device 110. A time-of-flight counter 150 at local device 110 determines time elapsed between transmission of the time-of-flight challenge by transmitter 130 and reception of the time-of-flight response at receiver 132. Processing time circuitry 152, at remote device 120, provides a fixed or measured processing time delay for signals to be retransmitted. Distance between the devices can then be determined based on the total time, less processing time at the receiver/transmitter 140/142, and any delay due to processing, while using the obscured leading edge to mitigate early detection of the TOF response. In some implementations, a leading edge of the TOF (challenge) signal is also obscured in this regard. Such an approach may also be carried out in reverse, with the transmitter 130 and receiver 132 at the remote device 120, and the receiver 140 and transmitter 142 implemented at the local device 110. In some implementations, such an approach may be carried out, with time-of-flight being determined at both the local and remote devices. Further, such embodiments may be carried out using low-frequency (LF) signals, high-frequency (HF) signals or a combination of LF and HF signals. Further iterations of the transmission of signals may be carried out to fine tune authentication and/or for synchronization.

Various embodiments are directed to an apparatus that obscures a leading edge of communications. Referring to remote device 120 in FIG. 1, one such embodiment is directed to a method and/or apparatus (e.g., as part of or as the remote device 120) in which the TOF response is generated as a first signal (e.g., 122) with a waveform having a plurality of pulses, each pulse in the waveform having a leading edge, a peak portion, and a trailing edge. For one or more of the plurality of pulses, a portion of the leading edge is obscured (e.g., at block 124) by generating noise via a noise modulation circuit, and the noise is combined with at least the leading edge of the at least one pulse. Distance-based authentication is provided by transmitting a second signal (TOF response) with a waveform having the obscured portion of the leading edge between radio frequency (RF) devices (e.g., 110 and 120).

Various embodiments add noise in one or more of a variety of manners. For instance, random-based noise may include noise that is additive or multiplicative in nature, noise that is present over an entire duration of a transmitted radio packet, or is confined to time intervals localized around the (leading edge) of the transmitted pulse positions, may include random or pseudo-random noise, may be derived from an imposed noise signal or include auxiliary leading pulses, and noise having amplitude (or phase) of any leading pulses that are random, pseudo-random, or agreed through a cryptographic channel between transmitter and receiver.

Figure 2:
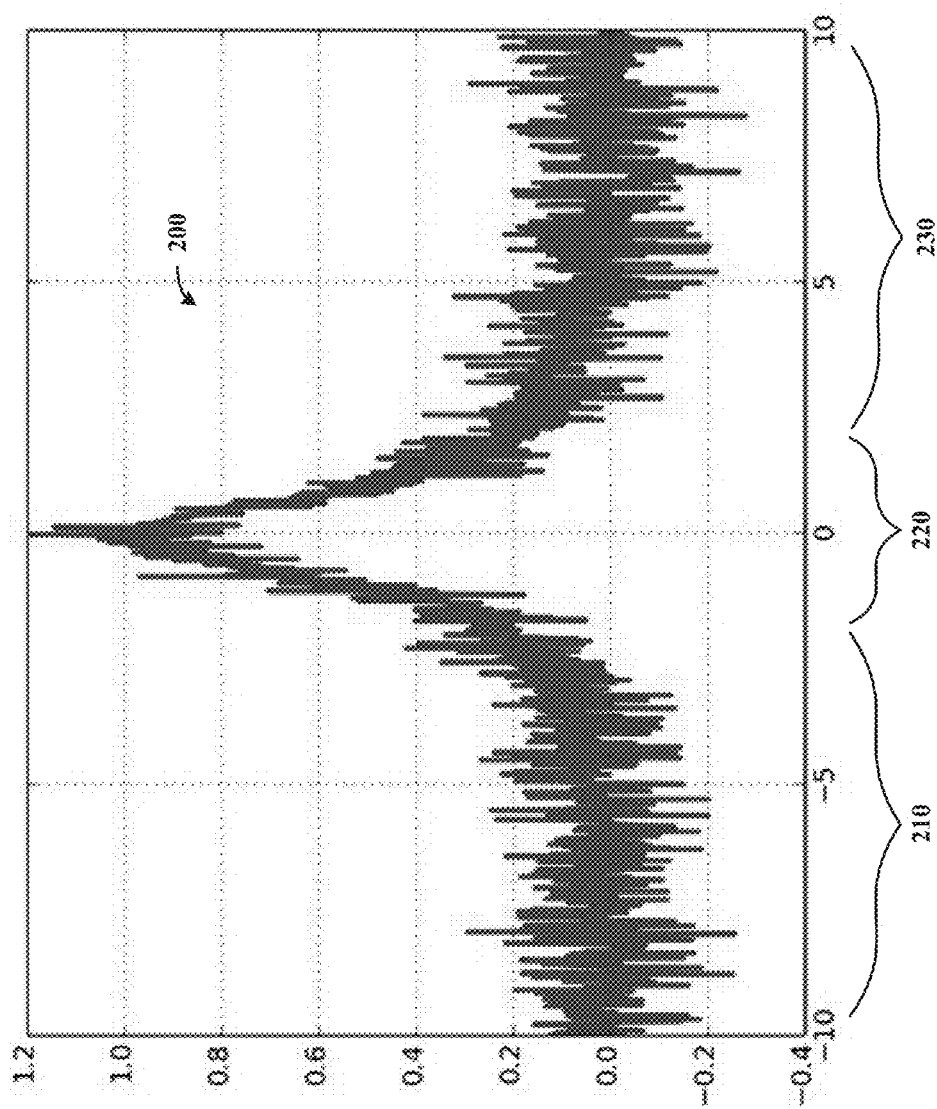
FIG. 2 shows a waveform that has been obscured, in accordance with one or more embodiments.

FIG. 2 shows a waveform 200 that has been obscured, in accordance with one or more embodiments. The waveform in FIG. 2 may, for example, be generated using the apparatus of FIG. 1, optical circuitry, or an apparatus as otherwise described herein. The waveform 200 has a leading edge 210, a peak portion 220 and a trailing edge 230. By way of example, noise has been added to all three leading edge, peak and trailing edge portions of the waveform 200; however, various embodiments are directed to obscuring predominantly the leading edge or a portion of the leading edge.

Figure 3:
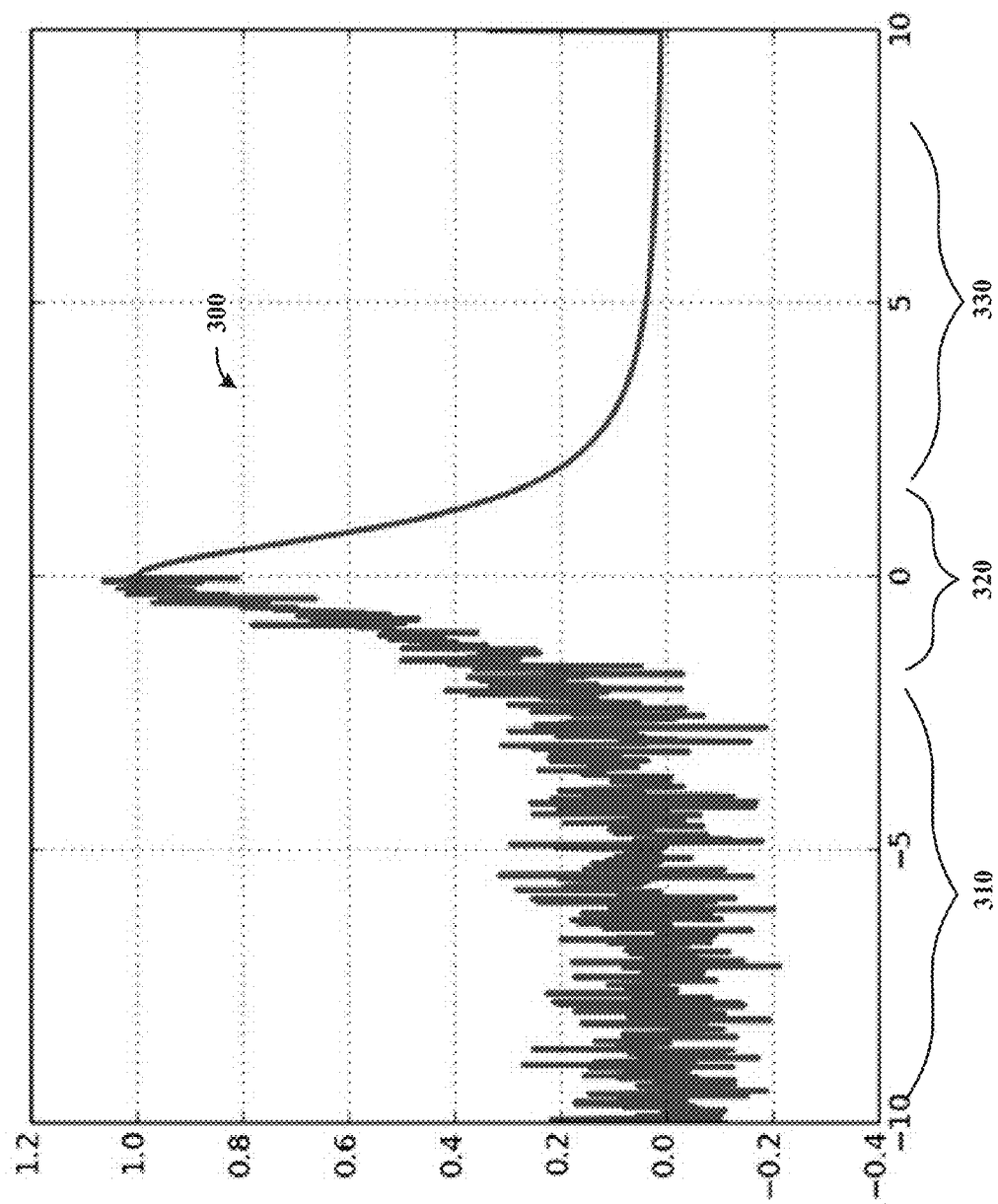
FIG. 3 shows an embodiment in which a waveform having a leading edge, peak portion and trailing edge, has been obscured.

FIG. 3 shows an embodiment in which a waveform 300 having a leading edge 310, peak portion 320 and trailing edge 330, has been obscured. Specifically, noise has been added to the leading edge 310 as well as an initial part of the peak portion 320, leading up to the peak itself at position "0" of the waveform.

Figure 4:
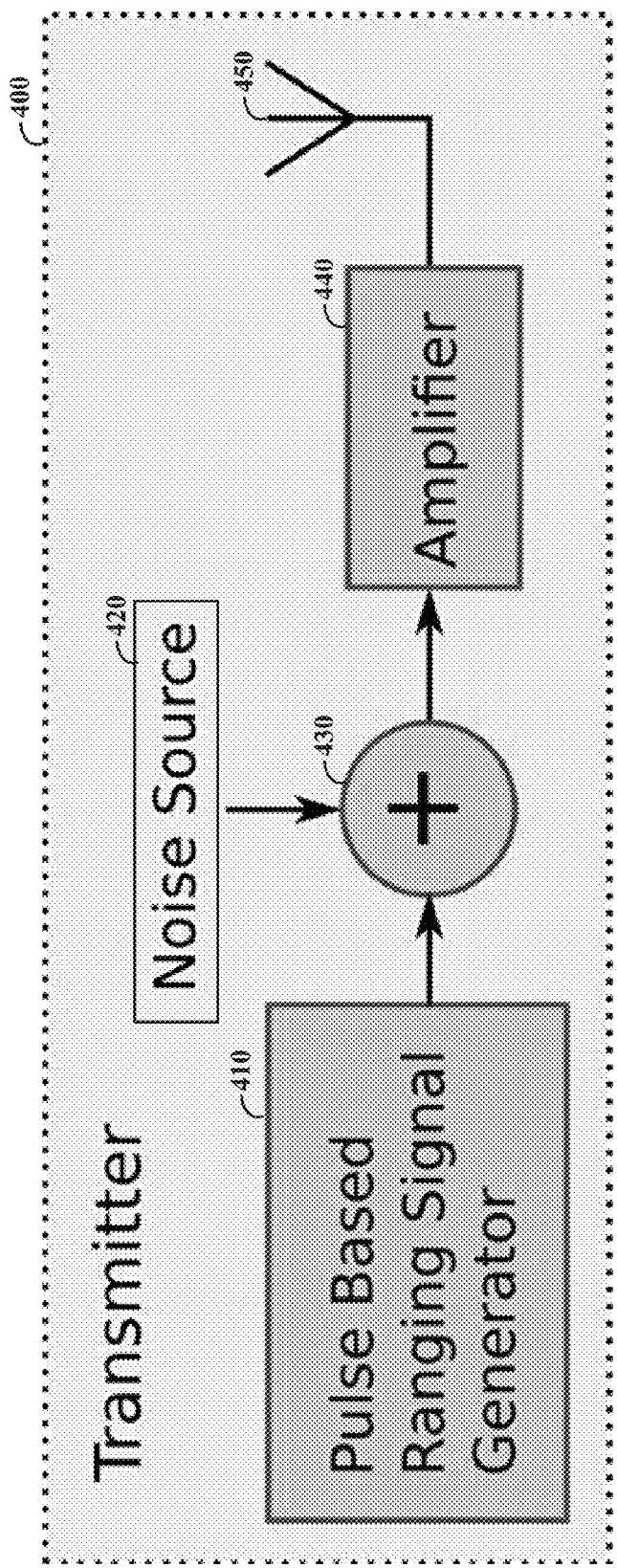
FIG. 4 shows an apparatus in which noise is combined with a signal via adding, in accordance with another embodiment.

FIG. 4 shows an apparatus 400 (e.g., transmitter) in which noise is combined with a signal via adding. The apparatus includes a pulse based ranging signal generator circuit 410, and a noise source 420 (e.g., including a noisy diode that generates noise). An adder circuit 430 receives and adds outputs of the pulse based ranging signal generator circuit 410 and the noise source 420 to provide an output signal that is passed to amplifier circuit 440. The amplifier circuit 440 amplifies the output signal, which is transmitted via antenna 450. In such implementations, the added noise can have the same or similar bandwidth characteristics of the transmitted signal generated by the pulse based ranging signal generator circuit 410. Consequently, the transmitter bandwidth need not be affected by this measure. In case of transmit power regulations, the power that goes into the added noise must be subtracted from the power budget that is available for the payload signal. In certain implementations, the adder circuit 430 is placed after the amplifier circuit 440, under which conditions a separate amplifier circuit may be used with the noise source 420.

Figure 5:
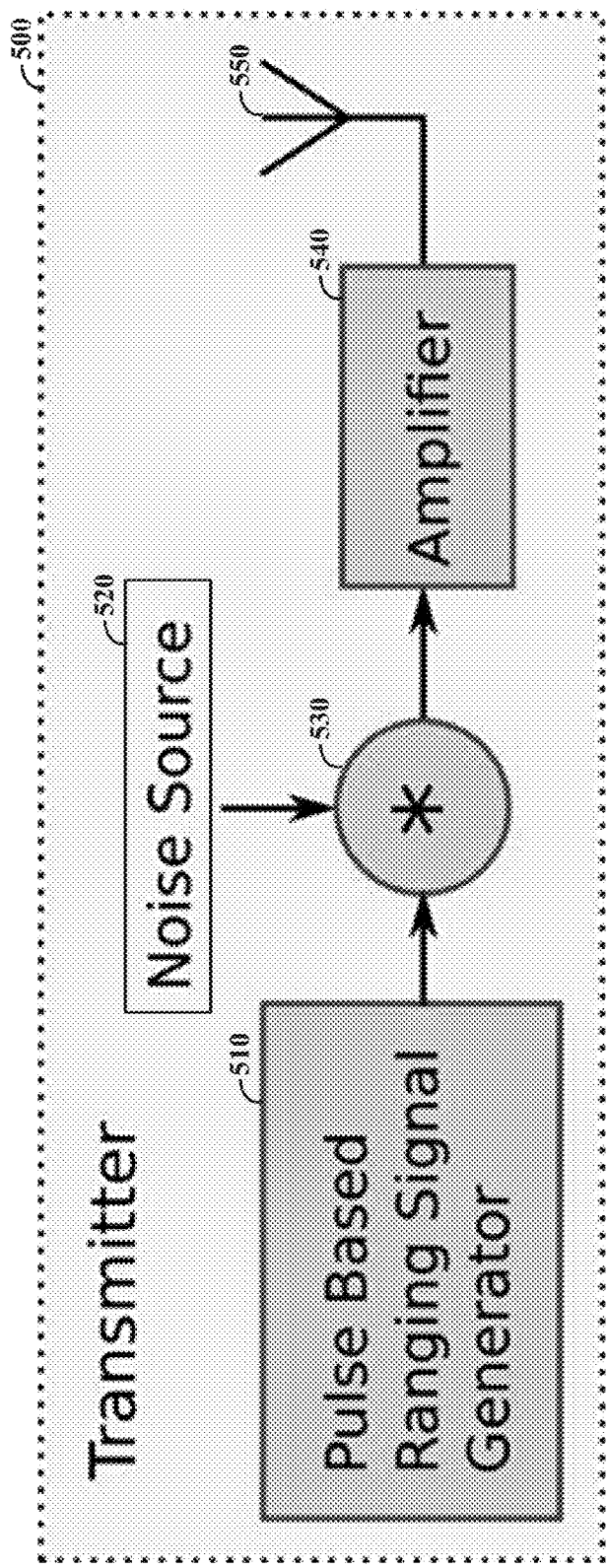
FIG. 5 shows an apparatus in which noise is combined via multiplication, in accordance with another embodiment.

FIG. 5 shows an apparatus 500 in which noise is combined via multiplication, in accordance with another example embodiment. The apparatus 500 is similar to the apparatus 400 in FIG. 4, and includes a pulse based ranging signal generator circuit 510, noise source 520, amplifier circuit 540 and antenna 550. The apparatus 500 also includes a multiplier circuit 530, which multiplies an output of the noise source 520 with an output of the pulse based ranging signal generator circuit 510, with the output being fed to the amplifier circuit 540. In various implementations, the noise signal has a DC value equal to 1 (or close thereto).

In a somewhat more particular embodiment, the strength of the noise signal generated at the noise source 520 (e.g., a noisy diode or other electrical component from which random-based noise is generated) is varied along with the pulse that is to be transmitted. For instance, with BPSK modulation, the strength of such multiplicative noise is varied along with the envelope of the BPSK signal. In some implementations, when the output of the pulse based ranging signal generator circuit equals zero, no transmit power is spent on the transmission of noise. For instance, with regulations that prescribe a certain maximum transmit power, this approach can increase the power budget that is available for the payload signal. For spectral transmit masks, the multiplication operator in the frequency domain gives a widening effect on the bandwidth of the signal.

Figure 6:
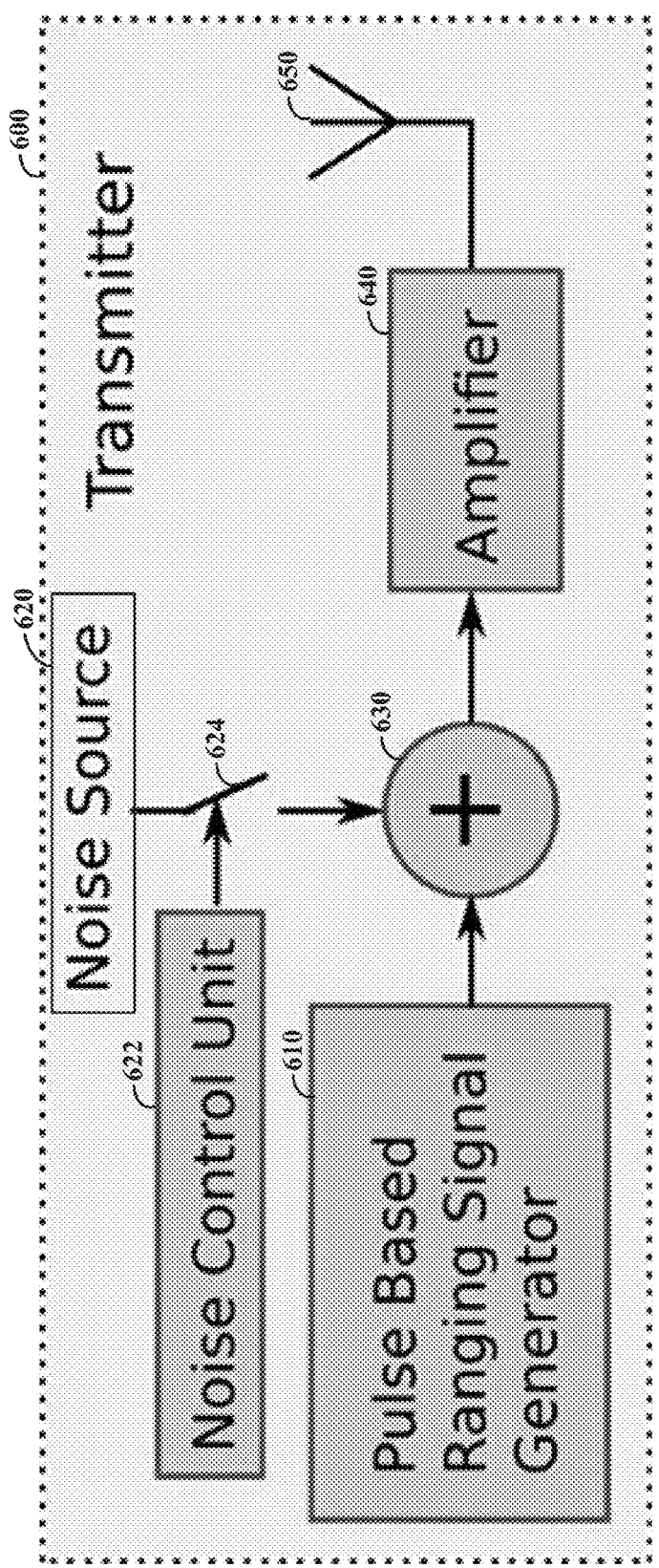
FIG. 6 shows an apparatus in which noise is combined via a switched application, in accordance with another embodiment.

FIG. 6 shows an apparatus 600 in which noise is combined via a switched application, in accordance with another example embodiment. The apparatus 600 is similar to the apparatus 400 in FIG. 4 and to the apparatus 500 in FIG. 5, and includes a pulse based ranging signal generator circuit 610, noise source 620, adder circuit 630 amplifier circuit 640 and antenna 650. The apparatus 600 also includes a noise control unit 622 that uses knowledge of the pulse positions to control a switch 624 that couples the noise source 620 to the adder circuit 630 (e.g., which may be implemented as a multiplier circuit). The noise source can be selectively coupled in this regard, such as to switch off the noise addition for part of the pulse (e.g., to form a pulse as shown in FIG. 3, or a pulse with the noise switched off slightly earlier such as over the entire peak region). For instance, with ultra wideband (UWB) signals, the introduction of noise during a large inter arrival time between pulse positions or during the trailing edge of pulses can be avoided.

In some implementations, noise is switched using a particular noise windowing shape, in which the strength of the noise is slowly increased prior to the position of the leading edge, and slowly decreased towards during the main body of the pulse. Such techniques can yield narrower bandwidths of the noise signal, which can be beneficial in complying with spectral regulations. Switching of the noise can also reduce the fraction of transmit power that is spent on the transmitted noise.

Figure 7:
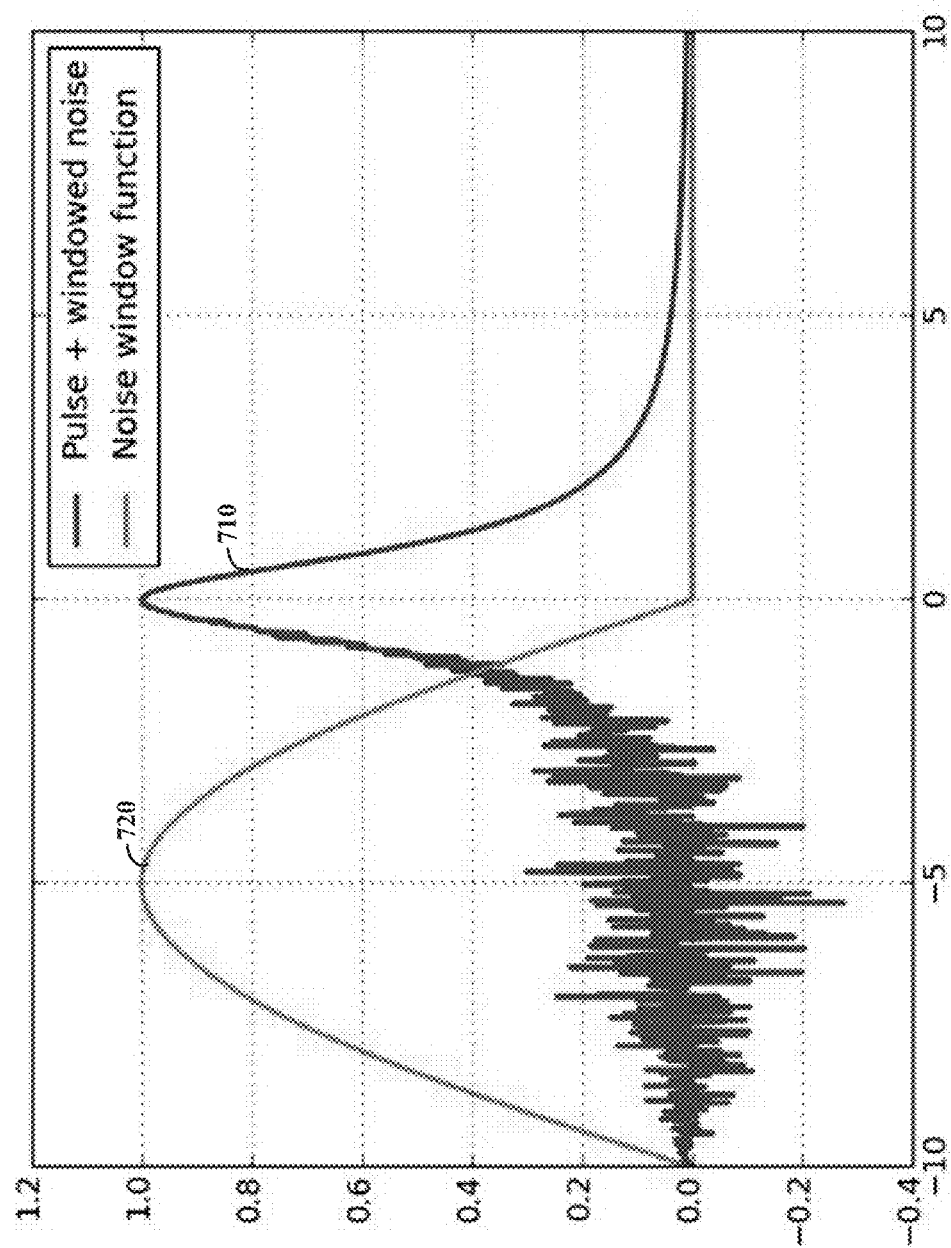
FIG. 7 shows an approach to switching using a noise windowing function to narrow the bandwidth of the noise signal, in accordance with another embodiment.

FIG. 7 shows an approach to switching (e.g., soft switching) using a noise windowing function to narrow the bandwidth of the noise signal, in accordance with another example embodiment. A pulse with windowed noise added is shown at 710, with the noise windowing function 720 used to generate the noise. The windowing function modulates the noise and can confine the variation in the transmitted signal to the leading edge of the pulses, which amounts to soft switching of the noise.

In various embodiments, pseudo random noise is implemented to obscure aspects of a leading edge of a pulse as characterized herein. In such embodiments, noise may be combined with a signal as a digital noise signal with pseudo random characteristics. Such a signal may be derived from a pseudo random noise generator circuit. In certain embodiments, the seed or state of the pseudo random number generator circuit is stored at respective devices between which signals are communicated, which can further mitigate interaction by an attacker not having knowledge of the noise characteristic.

Figure 8:
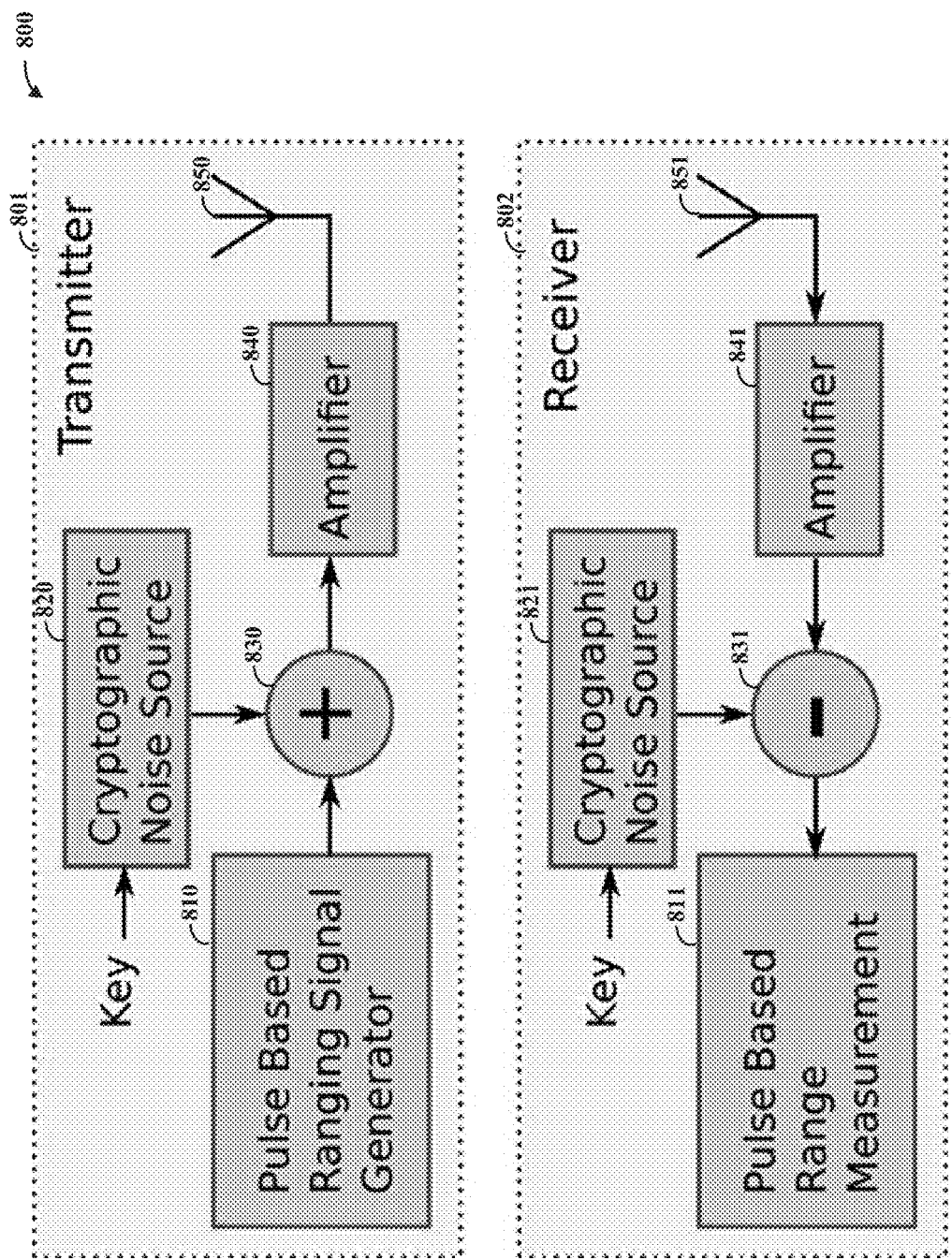
FIG. 8 shows an apparatus in which cryptographic noise is combined via multiplication, in accordance with another embodiment.

FIG. 8 shows an apparatus 800 in which cryptographic noise is combined via addition, in accordance with another example embodiment. The apparatus 800 has both transmitter 801 and receiver 802 components. The transmitter 801 includes a pulse based ranging signal generator circuit 810, a cryptographic noise source 820, and an adder circuit 830. The adder circuit 830 adds signals from the cryptographic noise source 820 and the pulse based ranging signal generator circuit 810 to provide an output to amplifier circuit 840, which is transmitted via antenna 850. The receiver 802 includes a pulse based range measurement circuit 811, a cryptographic noise source 821, subtraction circuit 831, amplifier circuit 841 and antenna 851. Various embodiments are directed to the entire apparatus 800, other embodiments are directed to the transmitter 801, other embodiments are directed to the receiver 802, and still other embodiments are directed to one or more components within the transmitter, receiver or a combination thereof.

The cryptographic noise source 820 is added at the transmitter 801 and subtracted at the receiver 802. The transmitter 801 shares a key accessed by the cryptographic noise source 820 with the receiver 802, which synchronizes with the transmitter and subtracts the noise through shared knowledge of the noise sequence via the cryptographic key.

Figure 9:
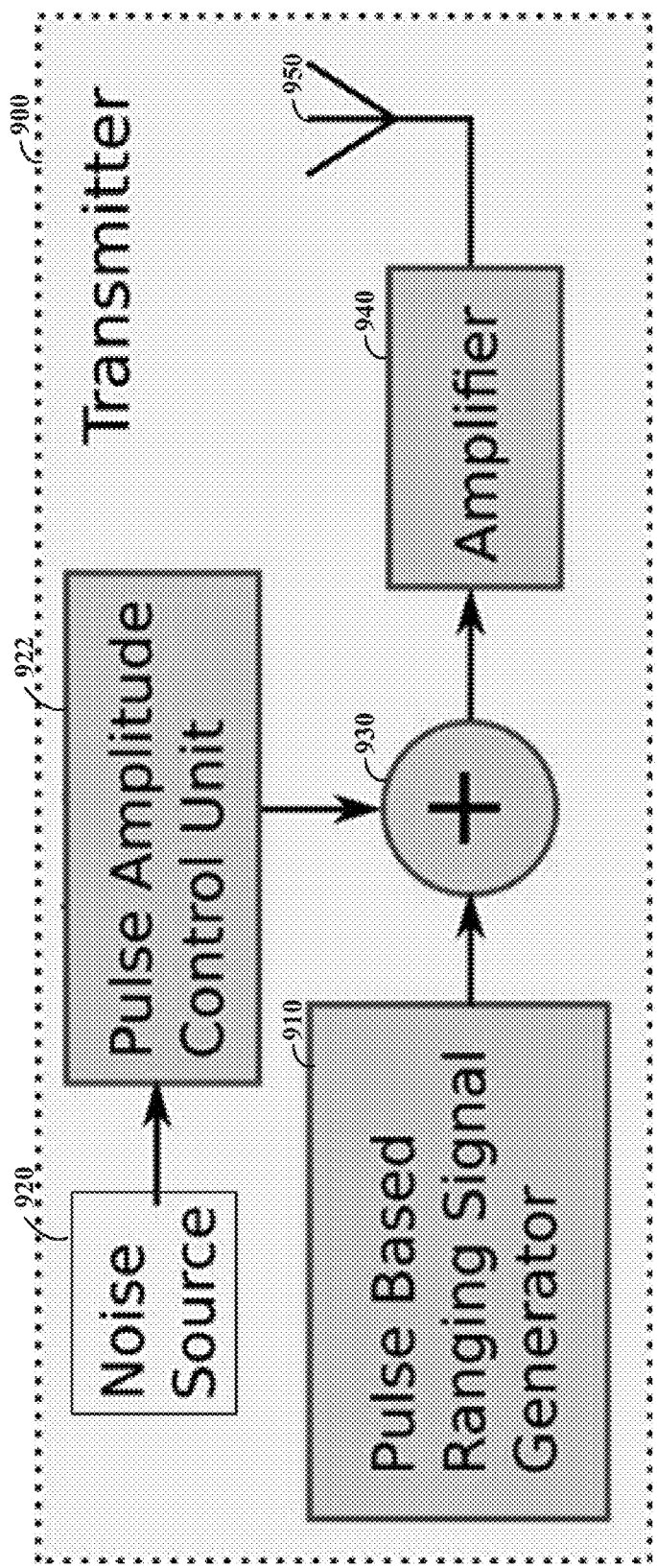
FIG. 9 shows an apparatus in which noise is combined with pulse amplitude control, in accordance with another embodiment.

FIG. 9 shows an apparatus 900 in which noise is combined with pulse amplitude control, in accordance with another example embodiment. The apparatus 900 includes a pulse based ranging signal generator circuit 910, noise source 920, pulse amplitude control unit 922, adder circuit 930, amplifier circuit 940 and antenna 950. The noise source 920 and pulse amplitude control unit 922 operate to generate auxiliary pulses with (pseudo) random amplitude to conceal the presence and amplitude of main pulses generated by the pulse based ranging signal generator circuit 910.

Figure 10:
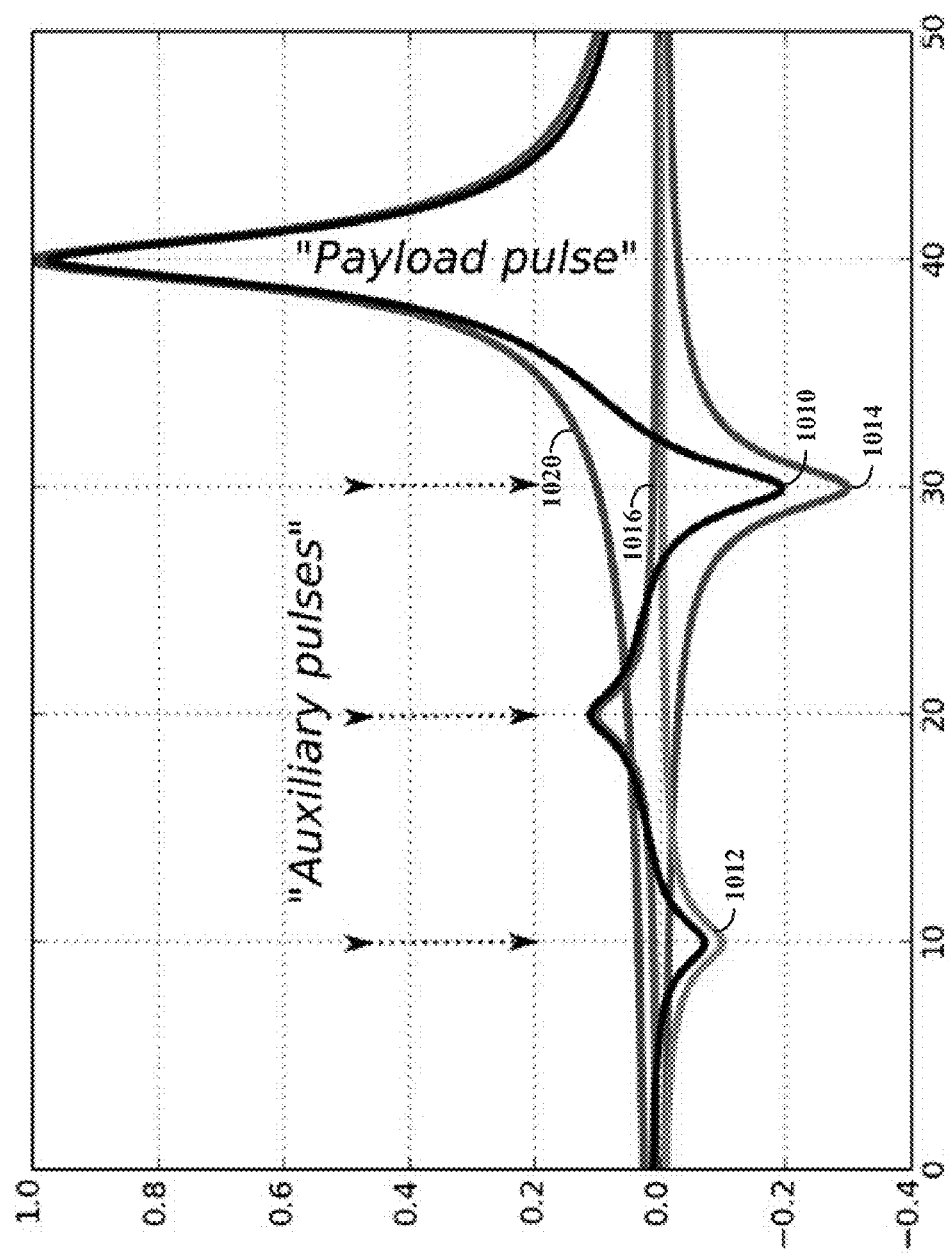
FIG. 10 shows plots of a noise signal as applied with auxiliary pulses for obscuring a main pulse, in accordance with another embodiment.

FIG. 10 shows plots of a noise signal as applied with auxiliary pulses for obscuring a main pulse, in accordance with another example embodiment. The signals shown in FIG. 10 may, for example, be generated with the apparatus shown in FIG. 9 (or similarly), with optical circuitry or other circuitry. Noisy variation as implemented with signal 1010 during the leading edge of a payload/main pulse 1020, with pulses 1012, 1014, and 1016 generated with a pulse amplitude control unit that discerns main, payload pulses and auxiliary pulses that mask the arrival of payload pulses. The leading edge of the pulse 1020 centered around horizontal time index 40 with amplitude 1 is concealed with the three auxiliary pulses 1012, 1014 and 1016 with (pseudo) random amplitudes ±0.1, ±0.2 and ±0.3 at horizontal time indices 10, 20 and 30, respectively. Without the auxiliary pulses, the leading edge of the main pulse may be detectable at time index 10. With the addition of the auxiliary pulses, the main pulse may be obscured until after time index 35 with respect to showing the main pulse being present and having a positive amplitude. Other embodiments involve a main pulse of zero (e.g., OOK) or negative (e.g., BPSK) amplitude or with different options regarding amplitude and phase (e.g., N-PAM, N-PSK, N-QAM).

The amplitude of the auxiliary pulses can be derived from a random number generator circuit whose state does not need to be known to the receiver, such as a noisy diode. The waveform and spectral characteristics of the auxiliary pulses can be chosen to be identical to that of the main, payload pulses. This way, the shape of the frequency spectrum that originates from the main pulses is preserved (to a large degree), with the power being slightly increased. The random nature of the introduced pulses can add randomness to the frequency spectrum with fewer spectral peaks. The power spent on the auxiliary pulses is proportional to the square of the amplitude of the pulses. Consequently, when the amplitude of these pulses is kept to be small for most auxiliary pulses relative to the main pulse (e.g., for a uniformly random auxiliary pulse amplitude, bounded by zero and the main pulse amplitude), and can be moderate for a last auxiliary pulse that precedes a payload pulse, such that the fraction of the total transmit power that needs to be spent on the concealment of the leading edges of the main pulses is limited, therein limiting power consumption.

In various embodiments, the auxiliary pulses can be part of an existing multi-pulse, such as burst-based UWB modulation, with the amplitude of some of the pulses made to be small and (pseudo) random. Such UWB modulation may be carried out with the Zigbee PRO specification from the Zigbee Alliance, or otherwise in accordance with IEEE 802.15.4a (e.g., with IR-UWB and pulse radars at 60 GHz and higher frequencies), and other embodiments may involve IEEE 802.15.4. This approach realizes a secure extension of such a standard, and the operation of the receiver can share a significant fraction of its functional elements between a standard compliant receiver mode and an extended, secure mode. The pseudo random variation introduced in the transmitted signal can be standard compliant.

Other embodiments are directed to the use of auxiliary leading pulses to obscure a signal, with amplitudes agreed through a cryptographic channel. The amplitude of pulses that mask the presence of later pulses derive from a cryptographically secure pseudo-random number generator circuit. In this situation, as transmitter and receiver share knowledge of the pseudo-random variation in all pulses, a legitimate receiver can use all pulses (also any "auxiliary pulses") for ranging and/or communication. Consequently, one payload pulse can serve an "auxiliary pulse" for another payload pulse, and the distinction between payload and auxiliary pulses may be dropped. The multiplicative nature of the imposed variation of the transmitted pulse amplitudes can be implemented as a secure scrambling approach. This scrambling is based on advanced cryptography that prevents an attacker from decoding the state of the scrambling apparatus, or predicting transmitted pulse amplitudes.

Figure 11:
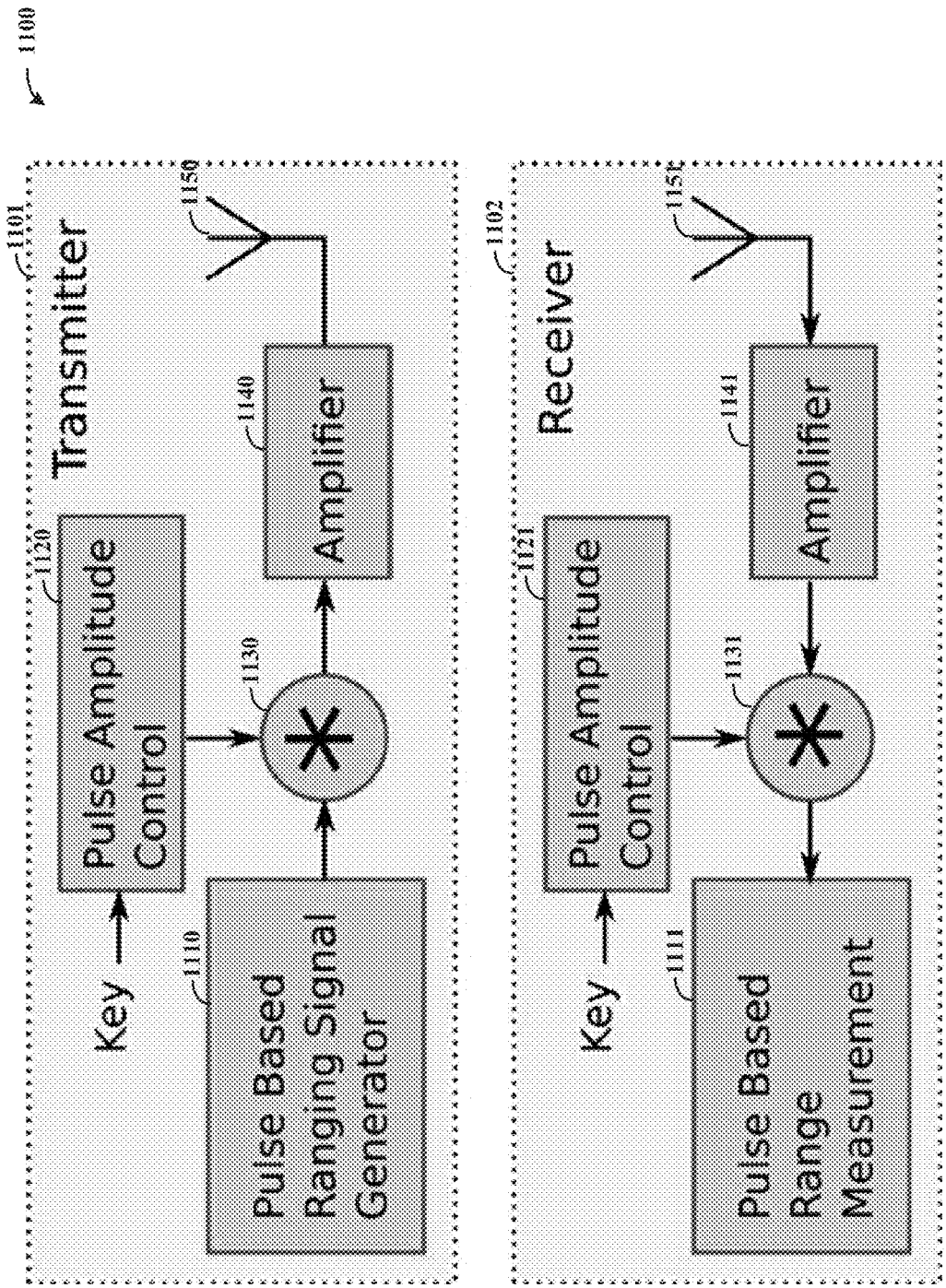
FIG. 11 shows an apparatus in which noise is combined with a shared session key, in accordance with another embodiment.

FIG. 11 shows an apparatus 1100 in which noise is combined with a shared session key, in accordance with another example embodiment. This approach may be implemented to provide auxiliary leading pulses to obscure a signal, with amplitudes agreed through a cryptographic channel as discussed above. The apparatus 1100 includes a transmitter 1101 having a pulse based ranging signal generator circuit 1110, a pulse amplitude controller 1120, a multiplier circuit 1130, amplifier circuit 1140 and antenna 1150. The apparatus 1100 also includes a receiver 1102 having a pulse based range measurement circuit 1111, a pulse amplitude control circuit 1121, a multiplier circuit 1131, amplifier circuit 1141 and antenna 1151. Various embodiments are directed to the transmitter 1101, other embodiments are directed to the receiver 1102, and other embodiments are directed to the entire apparatus 1100 including both the transmitter and receiver. Shared (session) ranging operation is carried out using bursts of pulses, in which the amplitudes of the pulses are determined by a secure key available to the pulse amplitude controllers 1120 and 1121 of both the transmitter 1101 and the receiver 1102.

Figure 12:
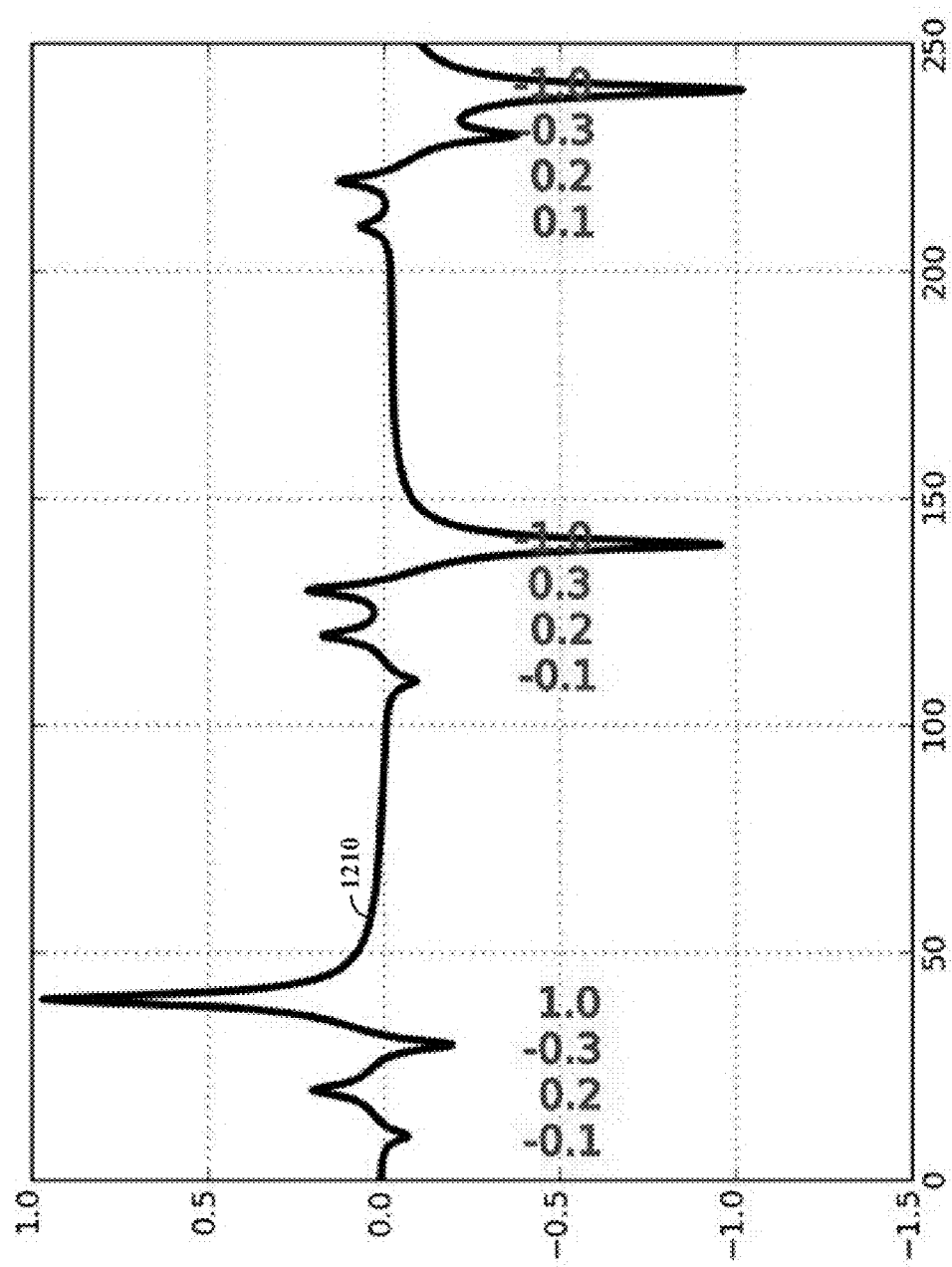
FIG. 12 shows a plot of bursts that include auxiliary pulses followed by a main or payload pulse, as may be implemented with various embodiments.

FIG. 12 shows a plot 1210 of bursts that include auxiliary pulses followed by a main or payload pulse, as may be implemented with various embodiments. The plot 1210 may, for example, be provided via one or more aspects of the apparatus 1100 as shown in FIG. 11, and the related approach discussed above. In some implementations, a BPSK-modulated main or payload pulse that carries ranging information is transmitted with a certain spacing between bursts, in which the amplitudes of each of the auxiliary pulses in these bursts is randomized. The receiver of the pulses correlates the received pulse amplitudes with a known pseudo-random pulse amplitude control sequence (shown via the numbers within the plot).

In some implementations, a burst that includes auxiliary pulses and a BPSK-modulated payload pulse is transmitted at periodic intervals. While a multitude of such bursts may convey a single information bit to the receiver, the amplitude of the payload pulses in successive bursts is scrambled as well. This approach may facilitate an increase in signal-to-noise ratio (SNR), as relative to schemes in which single bursts are mapped to single bits or pulses mapped to single bits. Such sub-bit-scrambling can be helpful as spectral peaks in the transmitted signal can be avoided, the transmitted signal can be DC free, and the receiver can correlate the received pulse amplitudes against a known scrambling sequence such that all the energy of all pulses are fully effective for ranging/communication. Such descrambling can be implemented as a direct sequence spread spectrum sequence, with a dedicated, pseudo-random scrambling sequence per transmitted information bit.

This approach as shown with FIG. 12 may be applied with any amplitude and/or phase based pulse modulation scheme, such as OOK, (D-)BPSK, ASK, N-PAM, (N-)PSK, or QAM. In addition, bursts can be split to contain multiple "sub-bursts" of sequences of auxiliary pulses and payload pulses each representing a "sub-bit." Multiple payload pulses, with cryptographically secure scrambling of the polarities (such that the polarity of one sub-bit can never be derived from another sub-bit), are assigned to a single bit in order to increase the SNR per bit (e.g., relative to schemes with single pulses mapped to single bits). This can be implemented for OOK or (D-)BPSK, as these modulation forms provide relatively high SNR per sub-bit compared to higher-order modulation forms.

In some implementations, amplitude randomization is carried out with a first pulse in each (sub-)burst that is relatively weak, such that its leading edge has a highest probability of ending up buried in the (thermal) noise floor of an attacker. Since there are limits to how well the leading edge can be concealed by the noise floor, in some implementations the choice may be made to ignore the first pulse of each (sub-)burst in the receiver, where such pulses would then end up being no more than auxiliary pulses, similar to the auxiliary pulse approach described above (e.g., with FIG. 9 and/or FIG. 10).

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., transmitting TOF signals or generate TOF responses, obscuring a leading edge, signal generation, comparing received data with stored data or otherwise involving encryption for authentication). For example, in certain of the above-discussed embodiments, one or more modules are discrete logic circuits or programmable logic circuits configured and arranged for implementing these operations/activities, as in the circuit modules shown in FIG. 1. The operations carried out in remote device 120 may be carried out in a logic circuit programmed to operate with the indicated steps. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. In addition, the various embodiments described herein may be combined in certain embodiments, and various aspects of individual embodiments may be implemented as separate embodiments. For instance, aspects of FIG. 1 may be implemented using one or more transmitters as depicted in other figures.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, communications can be obscured for TOF challenges at one or both of respective devices that are communicating. Similarly, further authentication communications (e.g., with encrypted authentication data) can be obscured in a similar manner. In addition, the combination of noise with a signal can be carried out at different stages, such as after or before amplification as shown. Such modifications do not depart from the true spirit and scope of various aspects of the invention, including aspects set forth in the claims.

What is claimed is:

1. A method comprising:
    generating, as part of distance-based authentication, a first signal with a waveform having a plurality of pulses, each pulse in the waveform having a leading edge, a peak portion, and a trailing edge;
    obscuring, for at least one pulse of the plurality of pulses, a portion of the leading edge by generating noise via a noise modulation circuit, and combining the noise with at least the leading edge of the at least one pulse, wherein the noise is statistically independent of amplitude level of the leading edge of the waveform; and
    providing the distance-based authentication by transmitting a second signal with a waveform having the obscured portion of the leading edge between first and second radio frequency (RF) devices.

2. The method of claim 1, wherein
    the second signal is used to provide an indication of distance between the first and second RF devices based upon a time over which the second signal is transmitted, while using the statistically independent noise to mitigate detection of the leading edge by a third RF device.

3. The method of claim 1,
    further including transmitting a third signal from the first RF device to the second RF device, and synchronizing communications between the first and second RF devices based upon signals communicated therebetween,
    wherein generating the first signal includes generating the first signal, at the second RF device, in response to receiving the third signal at the second RF device, and
    wherein providing the distance-based authentication includes calculating a trip time that includes a time between the transmission of the third signal by the first RF device and receiving the second signal at the first RF device, and providing a distance between the first and second RF devices based on the trip time.

4. The method of claim 3, wherein calculating the trip time includes calculating a time that includes time for processing the third signal as received at the second RF device, for generating and obscuring the first signal at the second RF device, and for transmitting the second signal from the second RF device.

5. The method of claim 3, wherein calculating the trip time includes calculating a time that includes time for processing the second signal as received at the first RF device.

6. The method of claim 3, wherein calculating the trip time includes calculating a time that includes time for:
    processing the third signal as received at the second RF device,
    generating and obscuring the first signal at the second RF device,
    transmitting the second signal from the second RF device, and
    processing the second signal as received at the first RF device.

7. The method of claim 1, wherein obscuring the portion of the leading edge includes combining the noise, received from the noise modulation circuit at a first input, with the at least the leading edge of the at least one pulse as received at a second input, the second input being different than the first input.

8. The method of claim 1, wherein obscuring the portion of the leading edge includes injecting noise at the leading edge of a position of the pulse.

9. The method of claim 8, wherein the noise includes cryptographic pulses transmitted between the first and second RF devices.

10. The method of claim 1, wherein the peak portion includes a majority of energy of each pulse and has an amplitude level that is greater than amplitude levels of the leading and trailing edges, the leading edge having a duration that is a multiple of a duration of the peak portion.

11. The method of claim 1, wherein the steps of generating, obscuring and providing are carried out in a transponder, further including authenticating the transponder based on data conveyed in the second signal by the transponder.

12. The method of claim 1, wherein obscuring the portion of the leading edge includes masking a polarity of the leading edge.

13. The method of claim 1, wherein obscuring the portion of the leading edge includes masking the existence of the leading edge.

14. The method of claim 1, wherein generating noise includes cancelling statistical bias introduced by a pulse of the first signal by biasing distribution of the noise.

15. An apparatus comprising:
a first circuit configured and arranged to generate, as part of distance-based authentication, a first signal with a waveform having a plurality of pulses, each pulse in the waveform having a leading edge, a peak portion, and a trailing edge;
a second circuit configured and arranged to obscure at least a portion of the waveform by generating noise and combining the noise with the portion of the waveform, thereby providing a second signal with a second waveform having the obscured portion thereof, wherein the noise is statistically independent of amplitude level of the leading edge of the waveform; and
a third circuit configured and arranged to provide the distance-based authentication by transmitting a second signal with the second waveform having the obscured portion between first and second communication circuits.

16. The apparatus of claim 15, wherein the second circuit is configured and arranged to obscure the portion of the waveform by combining the noise with at least the leading edge of at least one of the pulses.

17. The apparatus of claim 15, wherein the second circuit is configured and arranged to obscure the portion of the waveform by combining the noise with a portion of the waveform between the pulses to produce the second waveform, thereby obscuring a lack of a pulse in the portion of the waveform.

18. The apparatus of claim 15, wherein
the third circuit is configured and arranged to use the second signal to provide an indication of distance between the first and second communication circuits based upon a time over which the second signal is transmitted, while using the statistically independent noise to mitigate detection of the leading edge by a third communication circuit.

19. The apparatus of claim 15, wherein
the first communication circuit includes the first, second and third circuits,
the first circuit is configured and arranged to synchronize operation of a first RF device and to generate the first signal, based on a third signal received from a second RF device,
the third circuit is configured and arranged to provide the distance-based authentication based on trip time that includes a time for transmission of the third signal and for transmitting the second signal to the second communication circuit, therein providing an indication of a distance between the first and second communication circuits, and
the second circuit includes:
a signal modulation circuit configured and arranged to generate the noise as noise that is statistically independent of an amplitude level of the leading edge of the first signal, and
a combining circuit connected to the signal modulation circuit and to the first circuit, the combining circuit being configured and arranged to
receive the generated statistically independent noise from the signal modulation circuit at a first input,
receive the first signal at a second input, and
generate the second signal by combining the statistically independent noise received at the first input with the first signal received at the second input, and
output the second signal.

20. A method for mitigating third-party interference with communications between first and second communication circuits with distance-based authentication, the method comprising:
generating, as part of the distance-based authentication, a first signal with a waveform having a plurality of pulses, each pulse in the waveform having a leading edge, a peak portion, and a trailing edge;
generating noise;
obscuring, for at least one pulse of the plurality of pulses, a portion of the leading edge by combining the noise with at least the leading edge of the at least one pulse, thereby providing a second signal with a second waveform having the at least one pulse with an obscured leading edge, wherein the noise is statistically independent of amplitude level of the leading edge of the waveform; and
providing the distance-based authentication by transmitting the second signal between the first and second communication circuits.

* * * * *